United States Patent [19]

Huang

[11] Patent Number: 4,501,452
[45] Date of Patent: Feb. 26, 1985

[54] BULLDOZER TRACK SUPPORT ROLLER MOUNTING

[75] Inventor: Ray C. Huang, Bettendorf, Iowa
[73] Assignee: Deere & Company, Moline, Ill.
[21] Appl. No.: 445,346
[22] Filed: Nov. 29, 1982
[51] Int. Cl.³ .............................................. B62D 55/16
[52] U.S. Cl. .......................................... 305/27; 305/28
[58] Field of Search ....................... 305/24, 25, 27, 28

[56] References Cited
U.S. PATENT DOCUMENTS

| | | | |
|---|---|---|---|
| 1,399,370 | 12/1921 | White. | |
| 1,568,241 | 1/1926 | Rimailho | 305/27 X |
| 1,836,446 | 12/1931 | Christie | 305/27 X |
| 2,277,855 | 3/1942 | Mercier | 305/27 X |
| 3,826,325 | 7/1974 | Purcell et al. | |

*Primary Examiner*—David A. Scherbel

[57] ABSTRACT

A bulldozer has six track support rollers mounted on the associated track frame such that the first and last rollers are more or less rigid with the frame, the two rollers respectively next to the first and last rollers are vertically shiftably mounted and biased downwardly by respective springs having a first stiffness, and the middle two rollers are vertically shiftably mounted and biased downwardly by respective second springs having a stiffness a predetermined amount less than that of the first springs.

5 Claims, 5 Drawing Figures

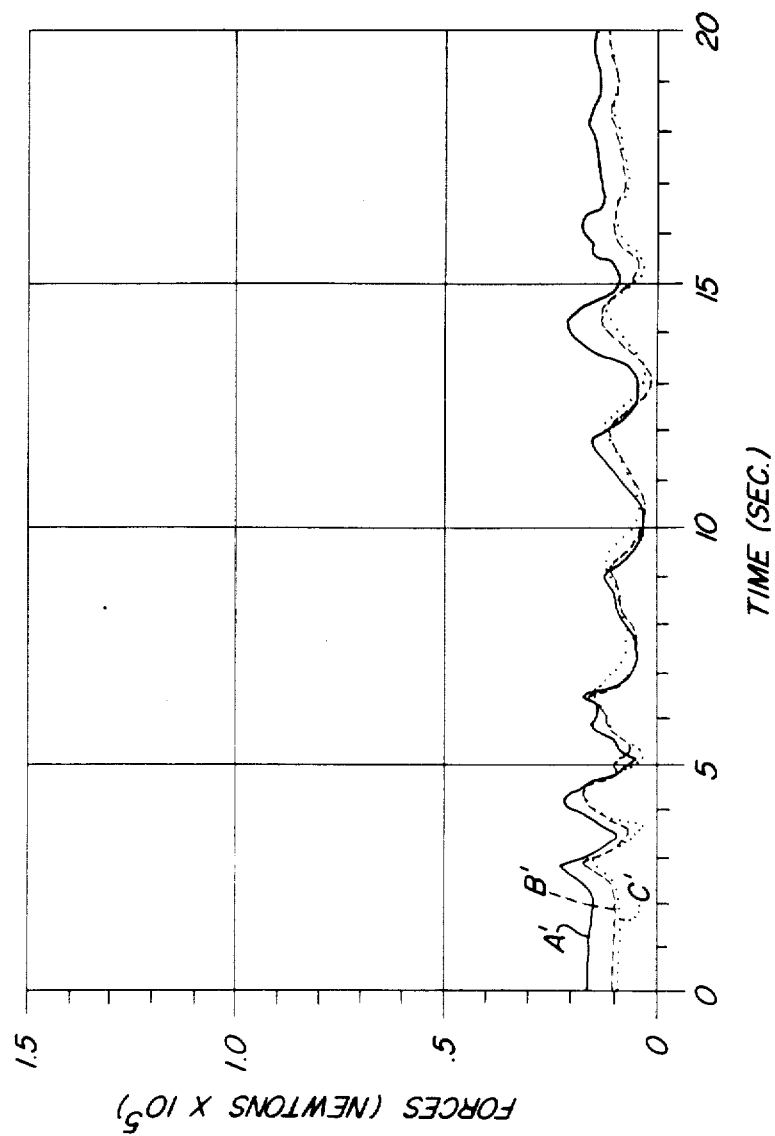

4,501,452

BULLDOZER TRACK SUPPORT ROLLER MOUNTING

BACKGROUND OF THE INVENTION

The present invention relates to bulldozer undercarriage and more specifically relates to track support systems for such undercarriage.

Bulldozers are often operated to level or grade the ground surface. When so operating, the bulldozers quite often undergo large pitch motions which cause their blades to cut an undesirable wavy ground surface.

SUMMARY OF THE INVENTION

According to the present invention there is provided an improved track support system for a bulldozer.

A broad object of the invention is to provide a bulldozer constructed such that during grading or leveling operation it undergoes only insignificant pitch motions.

A more specific object of the invention is to provide a bulldozer having its track supported such that the tendency for the bulldozer to develop severe pitch motions during grading or leveling operations is counteracted.

These and other objects are carried out by a track support structured in accordance with the present invention and including support rollers located between the drive sprocket and idler wheel and spring mounted such that the resistance to deflection increases as one proceeds oppositely from the central most roller mounts to the mounts respectively located closest to the sprocket and wheel. For a given force acting upwardly on the rollers, the latter are yieldably displaced upwardly such that a line drawn through the lowermost points of the rollers is upwardly arched, with the peak of the arch being located approximately vertically below a horizontal transverse axis adapted to pass through the center of gravity of a bulldozer with which the track support is intended for use.

BRIEF DESCRIPTION OF THE DRAWINGS

FIG. 5 is a graph similar to that of FIG. 4 but relating to a track support system constructed in accordance with the present invention.

DESCRIPTION OF THE PREFERRED EMBODIMENT

Figure 1:
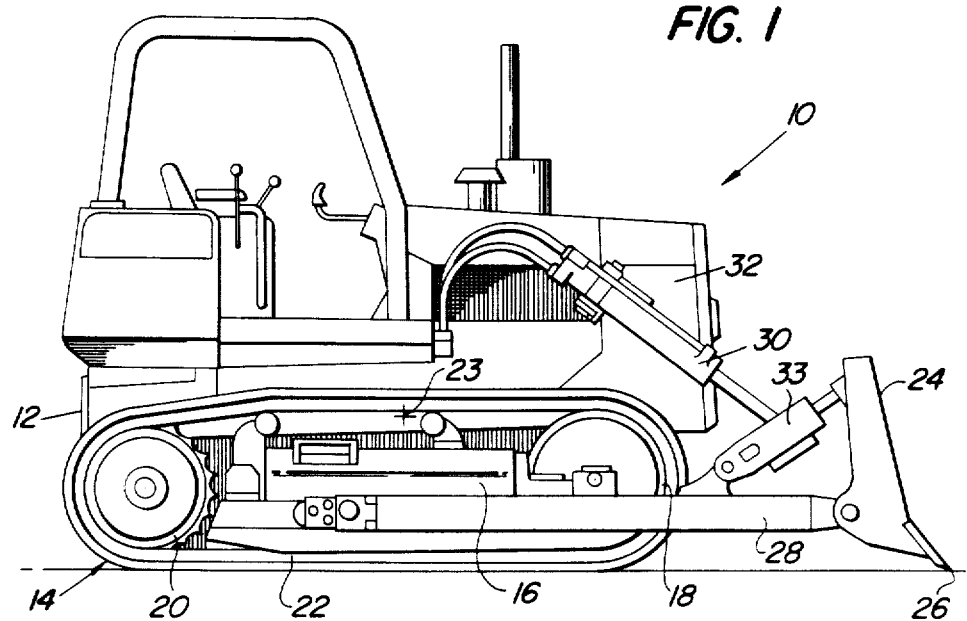
FIG. 1 is a side elevational view of a bulldozer of the type with which the track support of the present invention is particularly adapted for use.

Referring now to FIG. 1, therein is shown a crawler bulldozer 10 including a main frame 12 having track assemblies 14 (only one shown) coupled thereto and extending longitudinally along opposite sides thereof. Each track assembly 14 includes a longitudinal track frame 16 having an idler wheel 18 slidably supported on the forward end thereof, and supported from the main frame in fore-and-aft alignment with the idler wheel is a drive sprocket 20. A drive track 22 is trained about the idler wheel 18 and the drive sprocket 20.

A dozer blade 24 having a cutting edge or tip 26 is vertically swingably mounted to the track frames by a pair of push arms 28 (only one shown), and a pair of hydraulic lift actuators 30 (only one shown) is coupled between an upstanding support 32 at the forward end of the bulldozer and the push arms for selectively raising and lowering the blade 24. A pair of hydraulic pitch actuators 33 (only one shown) is coupled between the push arms and the top of the blade for adjusting the latter about its connection with the push arms.

Figure 2:
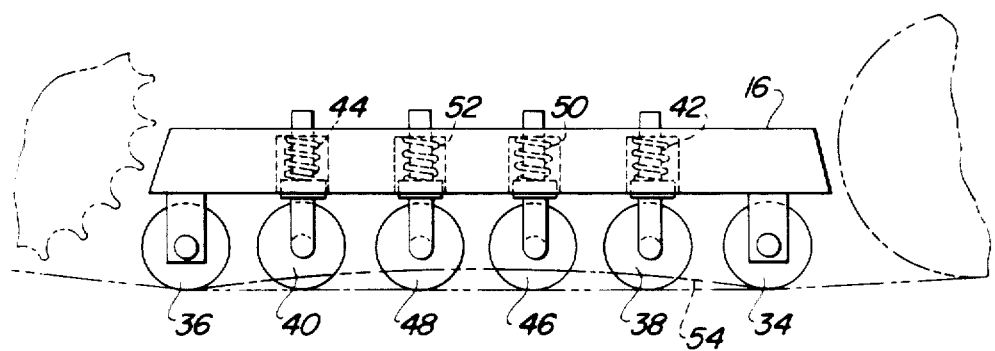
FIG. 2 is a schematic side elevational view of a track support system and showing track support rollers spring mounted in accordance with the present invention.

Referring now to FIG. 2, it can be seen that a plurality of track rollers are supported on the track frame 16 at locations spaced longitudinally along the track frame 16. Specifically, six rollers are provided with front and rear rollers 34 and 36, respectively being rigidly supported on the frame 16, with rollers 38 and 40 respectively adjacent the rollers 34 and 36 being vertically reciprocably mounted in the frame 16 and biased downwardly by springs 42 and 44 having equal spring rates $K_1$, and with central rollers 46 and 48 also being reciprocably mounted in the frame 16 and biased downwardly by springs 50 and 52 having equal spring rates $K_2$ which are less than the spring rates $K_1$. Accordingly, when the rollers are subjected to a given upward force, they will be deflected such that a line 54 (FIG. 2) drawn through their lowermost points will be upwardly arched. Preferably, the roller position and spring values are chosen such that the peak of the arched line 54 is located approximately vertically below the axis 23 which passes through the center of gravity of the bulldozer. As is described in more detail below, it has been found that for a given soil stiffness $K_s$ that satisfactory results will be obtained by making the spring rates $K_1$ in the range of from about 1 to 1.8 $K_s$, with about 1 $K_s$ being preferred, and the spring rates $K_2$ in the range from about 0.5 to 1.2 $K_s$, with about 0.5 $K_s$ being preferred.

Figure 3:
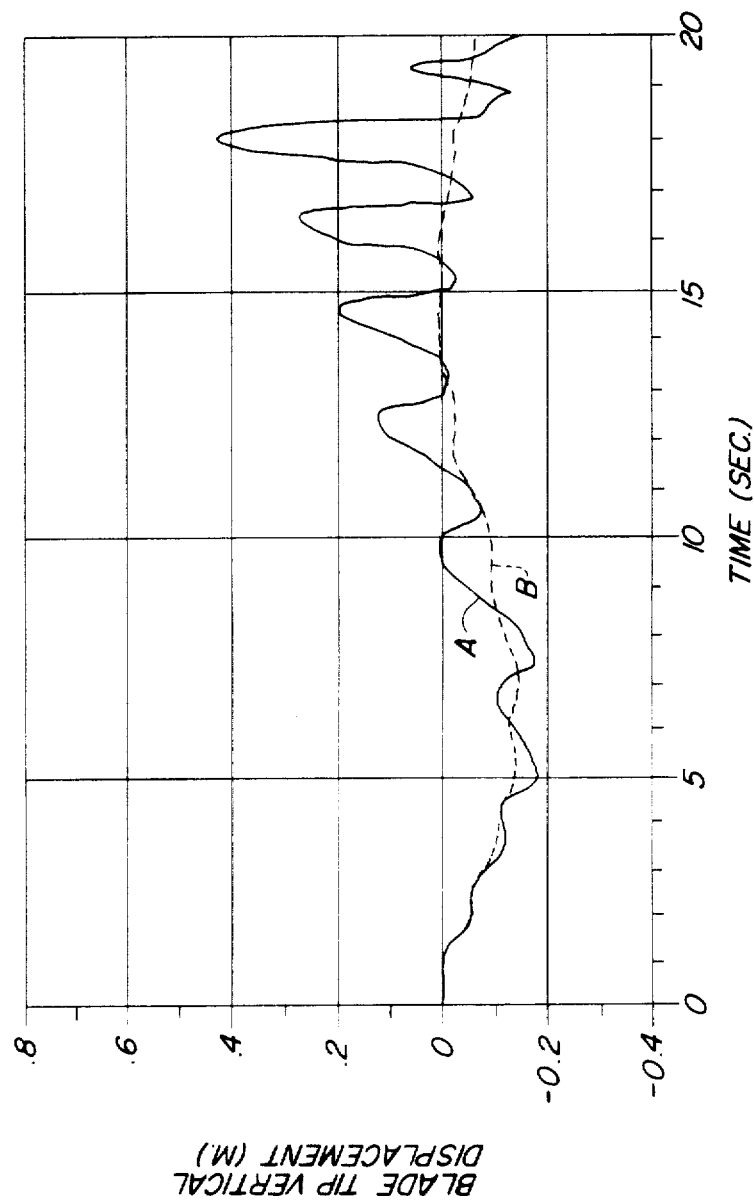
FIG. 3 is a graph depicting pitch motions experienced, over a given period of time, by the blade tips of bulldozers respectively equipped with conventional, rigid mounted track support rollers and track support rollers spring mounted in accordance with the principles of the present invention.

Referring now to FIG. 3, therein is shown a graph which illustrates the effectiveness of the track support roller arrangement shown in FIG. 2 in reducing pitch motions of the bulldozer 10. Specifically, the graph plots blade tip vertical motion in meters as a function of time in seconds beginning when an operator lowers the blade into the soil to be graded. Line A represents the vertical blade tip displacement of a bulldozer having a conventional track suspension with all of its rollers being fixed to the track frame while line B represents the vertical blade tip displacement of a bulldozer having a track suspension with the rollers mounted like those in FIG. 2. Beginning at 0 on the time axis, it can be seen that during approximately the first five seconds of operation, corresponding to the initial lowering of the blade into the ground, the lines A and B trace substantially identical paths. However, for the next thirteen seconds the blade pitch motion represented by the line A increases in amplitude while decreasing in period and thus becomes quite violent as compared to the blade pitch motions represented by the line B.

It will be understood, of course, that as the blade undergoes pitch motions, the ground profile left by the blade will be wavy. As the tracks of the bulldozer pass over the high points or peaks of the waves, less than the full length of the track will sometimes be in contact with the ground resulting in the weight of the bulldozer being supported on less than the full number of track support rollers. Also, as the bulldozer falls or pitches forwardly after climbing a wave, there will be impact loading of some of the rollers. The more violent the pitch motion the greater the loading on some of the rollers will be.

Figure 4:
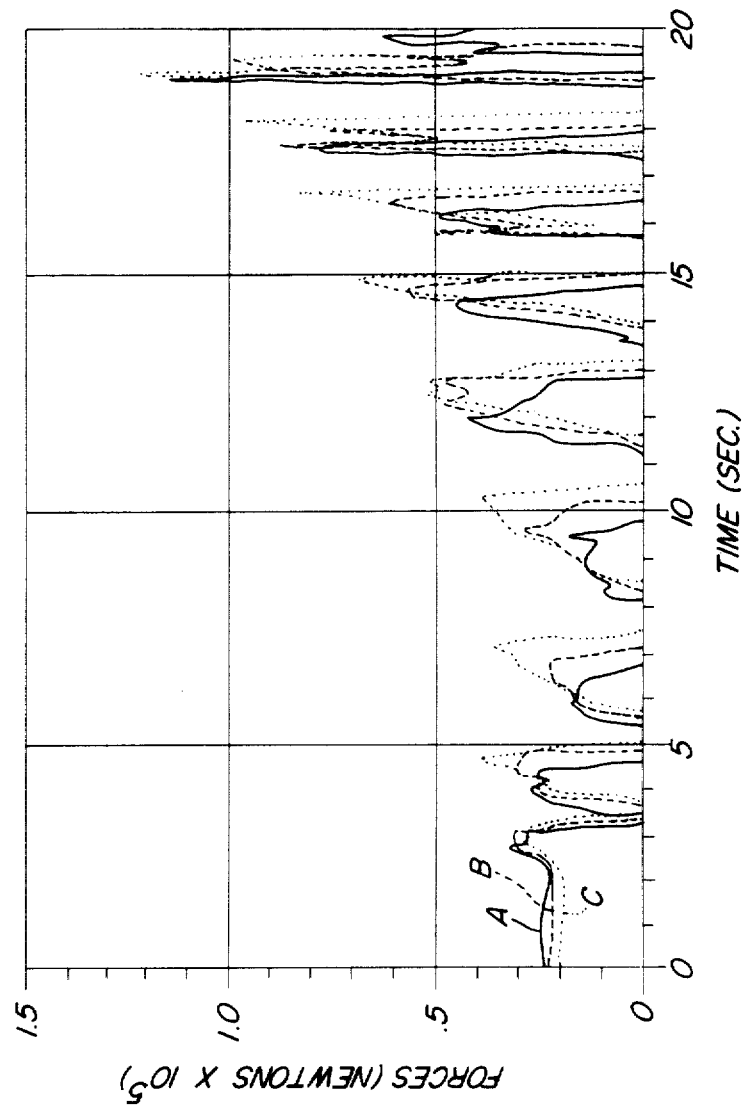
FIG. 4 is a graph depicting ground support forces experienced by certain track support rollers of a conventionally arranged track support system over a twenty second period of operation.

This is made evident by inspecting the graphs depicted in FIGS. 4 and 5, which cover the same time frame covered by the graph depicted in FIG. 3 and show the ground support forces experienced at any given time by the second, third and fourth track support rollers, as considered from front to rear. The graph in FIG. 4 relates to a bulldozer having conventionally arranged track support rollers while the graph in FIG. 5 relates to a bulldozer having track support rollers arranged like those shown in FIG. 2. Referring now to FIG. 4, the lines A, B and C respectively represent the ground forces experienced by the second, third and fourth rollers, and it can be seen that the forces experienced by those rollers generally cycle through ever increasing peaks once the initial five seconds of operation have passed. The largest peak forces experienced by the second, third and fourth rollers occur between 18.5 and 19.5 seconds and are 1.13, 1.2 and $0.98 \times 10^5$ Newtons, respectively. As can be seen in FIG. 5, where the lines A', B' and C' respectively relate to the forces experienced by the second, third and fourth rollers, the largest peak forces experienced at any time are 0.14, 0.12 and $0.12 \times 10^5$ Newtons, respectively. These forces are only about one-eighth, one-tenth and one-eighth, respectively, of the largest peak forces experienced by the conventionally arranged second, third and fourth track support rollers. Thus, with all other things being equal, the wear life of the track support rollers arranged as shown in FIG. 2 would be greater than that of the conventionally arranged rollers.

While the disclosed embodiment uses six equally spaced support rollers, it should be understood that other roller arrangements could be employed without departing from the principles of the invention.

I claim:

1. In a bulldozer track support system including a plurality of track rollers mounted along a longitudinally extending track frame, the impovement comprising: means resiliently mounting at least a central contiguous group of the rollers to the track frame such that the resistance of individual rollers of the group of rollers to vertical deflection increases as one proceeds oppositely from the center of the group towards front and rear ends of the track frame such that a given vertical force applied to the track rollers of said group will cause the latter to deflect to positions whereat a line drawn through their lowermost points is upwardly arched.

2. The bulldozer track support system defined in claim 1 wherein six rollers are provided and said means resiliently mounting at least a central contiguous group of the rollers including first biasing means providing equal resistance to upward movement of a central pair of said rollers and second biasing means providing equal resistance, a predetermined amount greater than that afforded by the first biasing means, to upward movement of a second pair of said rollers respectively adjacent the central pair of said rollers and a third pair of rollers being non-resiliently mounted on the track frame at respective locations adjacent the second pair of rollers.

3. The bulldozer track support system defined in claim 2 wherein for a given soil stiffness $K_s$, of a soil to be graded by the bulldozer, the first biasing means has a stiffness in the range from about $0.5 K_s$ to $1.2 K_s$ while the second biasing means has a stiffness in the range from about $1 K_s$ to $1.8 K_s$.

4. The bulldozer track support system defined in claim 2 wherein for a given soil stiffness $K_s$, of soil to be graded by the bulldozer, the first biasing means has a stiffness equal to $0.5 K_s$ while the second biasing means has a stiffness equal to $1 K_s$.

5. The bulldozer track support system defined in claim 1 wherein the upwardly arched line has a peak located so as to be approximately vertically below a horizontal transverse axis located so as to pass through the center of gravity of a bulldozer with which the support system is adapted for use.

* * * * *